United States Patent
Watanabe

(10) Patent No.: US 10,252,417 B2
(45) Date of Patent: Apr. 9, 2019

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Daisuke Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 15/443,429

(22) Filed: Feb. 27, 2017

(65) Prior Publication Data

US 2017/0256046 A1  Sep. 7, 2017

(30) Foreign Application Priority Data

Mar. 2, 2016 (JP) .................................. 2016-040445
Jan. 10, 2017 (JP) .................................. 2017-002117

(51) Int. Cl.
G06K 9/00 (2006.01)
B25J 9/16 (2006.01)
(Continued)

(52) U.S. Cl.
CPC ........... *B25J 9/1612* (2013.01); *B25J 9/1687* (2013.01); *G06K 9/52* (2013.01); *G06K 9/6215* (2013.01);
(Continued)

(58) Field of Classification Search
CPC ............ B25J 9/1612; G06T 7/75; G06K 9/52; G06K 9/6215
See application file for complete search history.

(56) References Cited

U.S. PATENT DOCUMENTS 7,058,205 B2 * 6/2006 Jepson ............... G06K 9/00228
382/103
7,983,487 B2 * 7/2011 Agrawal ............ B22D 11/1265
345/426
(Continued)

FOREIGN PATENT DOCUMENTS

JP 2015-114722 A 6/2015

OTHER PUBLICATIONS

R. Y. Tsai, "A versatile camera calibration technique for high-accuracy 3D machine vision using off-the-shelf TV cameras and lenses", IEEE Journal of Robotics and Automation, vol. RA-3, No. 4, 1987, pp. 323-344.
(Continued)

*Primary Examiner* — Gregory M Desire
(74) *Attorney, Agent, or Firm* — Carter, DeLuca & Farrell, LLP

(57) ABSTRACT

An information processing apparatus, comprises an obtainment unit configured to obtain a relative position and orientation between a first object and a second object; an specifying unit configured to specify an occlusion region where the second object occludes the first object, from an image that includes the first object and the second object, based on the relative position and orientation, a first shape model that represents a shape of the first object, and a second shape model that represents a shape of the second object; and a generation unit configured to generate information for obtaining a position and orientation of the first object based on the occlusion region.

15 Claims, 8 Drawing Sheets

(51) Int. Cl.
  *G06K 9/52* (2006.01)
  *G06K 9/62* (2006.01)
  *G06T 7/73* (2017.01)
  *G06K 9/46* (2006.01)

(52) U.S. Cl.
  CPC ........ *G06T 7/75* (2017.01); *G06K 2009/4666* (2013.01); *G06T 2207/30164* (2013.01)

(56) References Cited

U.S. PATENT DOCUMENTS

| | | | | |
|---|---|---|---|---|
| 8,175,412 B2 * | 5/2012 | Basri | ........................ | G06K 9/34 382/100 |
| 9,889,564 B2 * | 2/2018 | Cronie | ................... | B25J 9/1669 |
| 9,981,382 B1 * | 5/2018 | Strauss | .................. | B25J 9/1666 |
| 2008/0310720 A1 * | 12/2008 | Park | .......................... | G06T 7/73 382/181 |
| 2009/0116732 A1 * | 5/2009 | Zhou | .................... | H04N 13/139 382/154 |
| 2016/0205382 A1 * | 7/2016 | Chen | .................... | G06K 9/6265 382/203 |
| 2016/0253562 A1 * | 9/2016 | Yuki | ........................ | G06T 7/73 382/153 |
| 2017/0236268 A1 | 8/2017 | Watanabe | | |
| 2017/0256046 A1 * | 9/2017 | Watanabe | ............. | G06T 7/0004 |
| 2017/0286801 A1 * | 10/2017 | Rampal | ................ | G06K 9/6209 |

OTHER PUBLICATIONS

Tateno, et al., "A Model Fitting Method Using Intensity and Range Images for Bin-Picking Applications", IEICE Transactions on Information and Systems J94-D(8), 1410-1422, 2011. pp. 1-14.

* cited by examiner

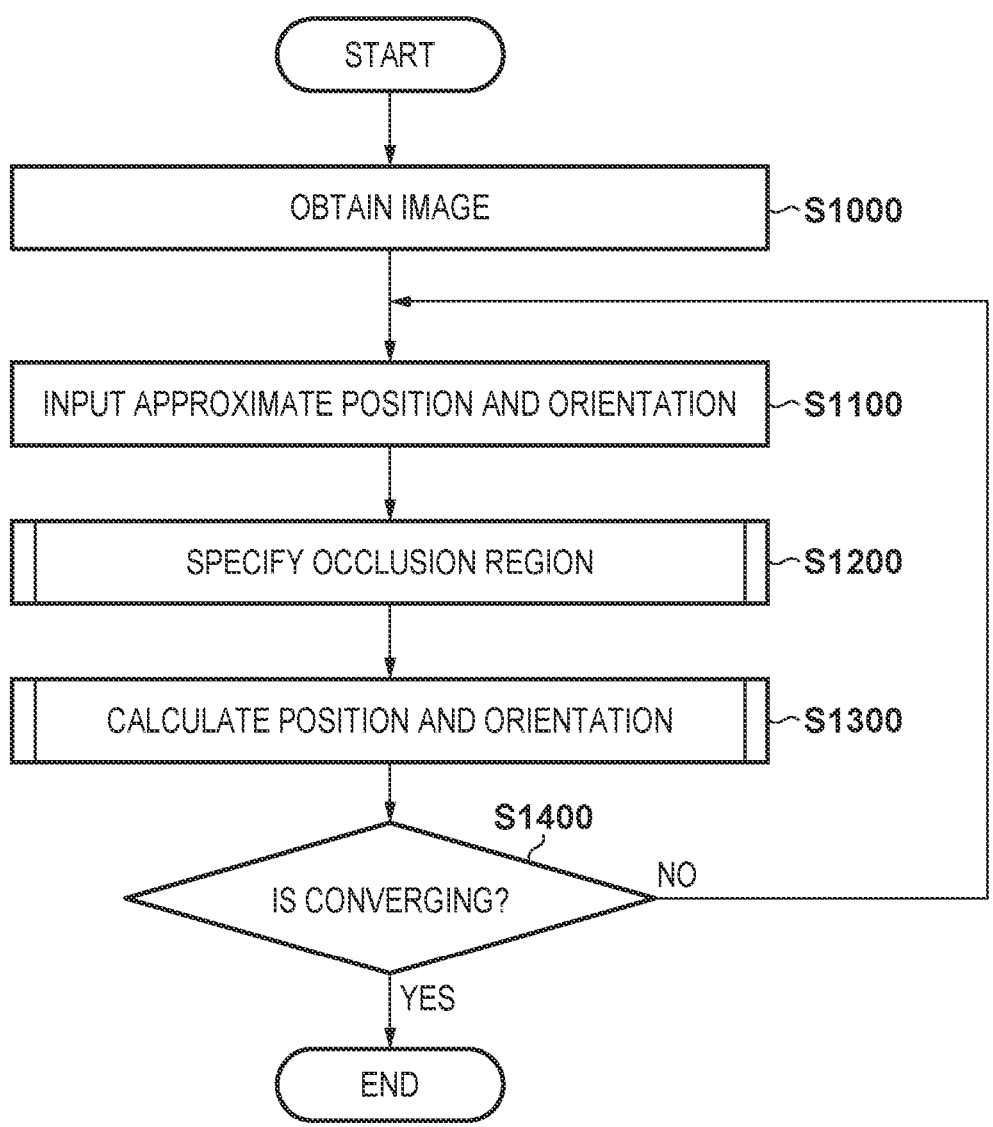

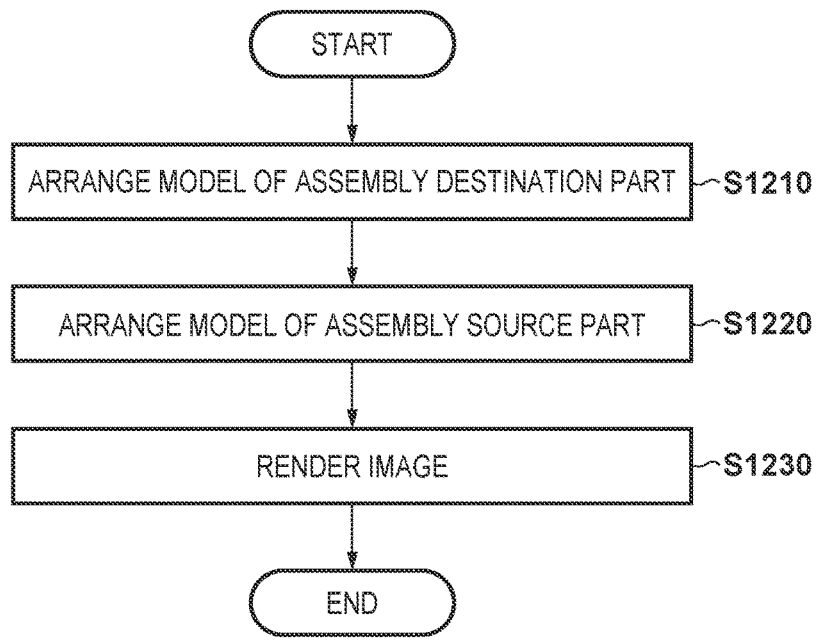
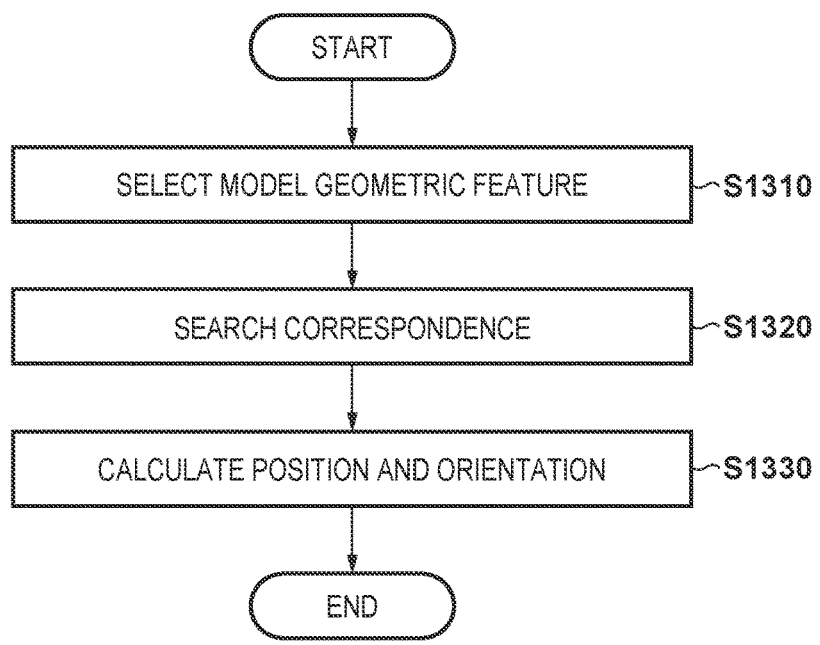

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling an information processing apparatus, and a storage medium.

Description of the Related Art

Together with the development of robot technology in recent years, complicated tasks such as assembling an industrial product are coming to be performed by robots instead. With such a robot, assembling is performed by parts being gripped by an end effector such as a hand. In a parts assembling operation by a robot, assembling may fail due to an improper mixing of parts or a misalignment when a part is gripped by a hand. Therefore, after parts are assembled, a post component assembly inspection for confirming whether assembly has been performed successfully is necessary. In recent years, effort to automate this post assembly inspection has started to be performed.

In Japanese Patent Laid-Open No. 2015-114722, a method for performing a post assembly inspection by using a captured image of an assembled part that is configured by two parts is disclosed. In this method, a position and orientation of an assembly source part that is gripped/moved by the robot and a position and orientation of an assembly destination part that is a counterparty of assembly are each calculated, and by comparing a relative relationship of the two with an ideal assembly state, a quality of assembly is determined.

However, in a captured image of an assembled part, a region in which one part occludes the other part in a periphery of an assembled portion occurs. Due to the influence of an occlusion region, there are cases in which it is not possible to reliably calculate the position and orientation of the assembly destination part or the assembly source part. In a method of using a three-dimensional shape model of a part to minimize corresponding distances with geometric features in an image as in Japanese Patent Laid-Open No. 2015-114722, there is the problem that robustness and precision decrease if there are many occlusion regions, and it is not possible to calculate a correct position and orientation of the part.

The present invention was conceived in view of the above problem, and provides a technique that is capable of robustly obtaining the position and orientation with good precision with respect to a part for which occlusion occurs due to another part in accordance with assembly.

SUMMARY OF THE INVENTION

According to one aspect of the present invention, there is provided an information processing apparatus, comprising: an obtainment unit configured to obtain a relative position and orientation between a first object and a second object; an specifying unit configured to specify an occlusion region where the second object occludes the first object, from an image that includes the first object and the second object, based on the relative position and orientation, a first shape model that represents a shape of the first object, and a second shape model that represents a shape of the second object; and a generation unit configured to generate information for obtaining a position and orientation of the first object based on the occlusion region.

Further features of the present invention will become apparent from the following description of exemplary embodiments with reference to the attached drawings.

BRIEF DESCRIPTION OF THE DRAWINGS

FIG. 3 is a flowchart illustrating a procedure overview of position and orientation calculation processing for an assembly destination part that is implemented by the information processing apparatus according to the first embodiment.

FIG. 4 is a flowchart illustrating a procedure for processing to identify an occlusion region that is implemented by the information processing apparatus according to the first embodiment.

FIG. 5 is a flowchart illustrating a detailed procedure for position and orientation calculation processing that is implemented by the information processing apparatus according to the first embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment: Calculate a Position and Orientation by Excluding an Occlusion Region from a Model <Overview>

In the present embodiment, explanation is given regarding a case in which an information processing apparatus is applied to a position and orientation calculation of an assembly destination part.

Figure 1A:
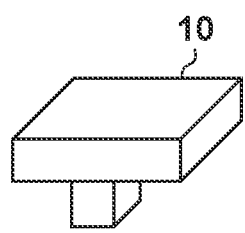
FIG. 1A to FIG. 1C are views illustrating an example of an assembly source part and an assembly destination part according to a first embodiment.
Figure 1B:
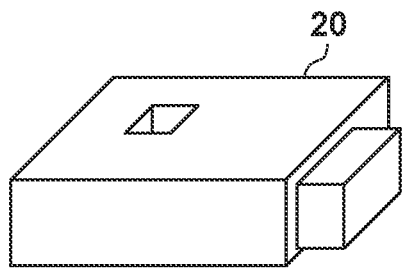
Figure 1C:
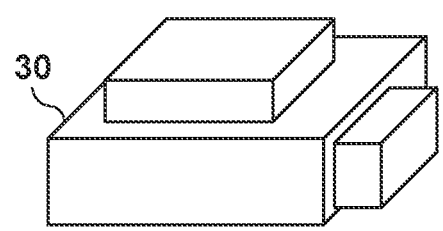

An assembled part 30 configured from two parts (two objects), with an example illustrated in FIG. 1C, is assumed to be handled. The assembled part 30 is configured by including an assembly source part 10 as illustrated in FIG. 1A that is gripped/moved by a robot hand (not shown), and an assembly destination part 20 as illustrated in FIG. 1B that is a counterparty for assembly with the assembly source part 10. In the present embodiment, calculating the position and orientation of the assembly destination part 20 based on a captured image of the assembled part 30 is envisioned. Note that the "position and orientation" discussed in the present embodiment means a position and orientation relation between the assembly destination part 20 and an image capturing apparatus (not shown) that captures the part.

Below, an overview of position and orientation calculation processing in the present embodiment is simply discussed. Firstly, three-dimensional shape models of the assembly source part 10 and the assembly destination part 20 are prepared. Additionally, a relative position and orientation for both in an ideal assembly state is set in advance. An image of the assembled part 30 is captured, and the position and orientation of the assembly destination part 20 is calculated.

Firstly, an approximate position and orientation of the assembly destination part 20 in the captured image is set. Here, from a relative position and orientation between the approximate position and orientation of the assembly destination part 20 and the assembly source part 10 in an ideal assembly state, it is possible to also obtain an approximate position and orientation of the assembly source part 10 in the captured image. Accordingly, three-dimensional shape models of the assembly destination part 20 and the assembly source part 10 are projected on the image based on each approximate position and orientation.

A correspondence relationship between three-dimensional shape model of the assembly destination part 20 and geometric features on the image are then used to calculate the position and orientation. At this point, a portion for which occlusion due to the assembly source part 10 with respect to three-dimensional shape model of the assembly destination part 20 occurs is not used. Because of this, it is possible to robustly and with high precision calculate the position and orientation without receiving an effect of a mismatch between the measurement data and the model due to the occlusion region.

In the following explanation, detailed discussion is given regarding a method, based on the relative relationship between an assembly destination part and an assembly source part, that specifies a region on an image where the assembly destination part 20 that is a measurement target is occluded, and uses a three-dimensional shape model of a portion that is not occluded to calculate the position and orientation.

<Configuration of the Information Processing Apparatus>

Figure 2:
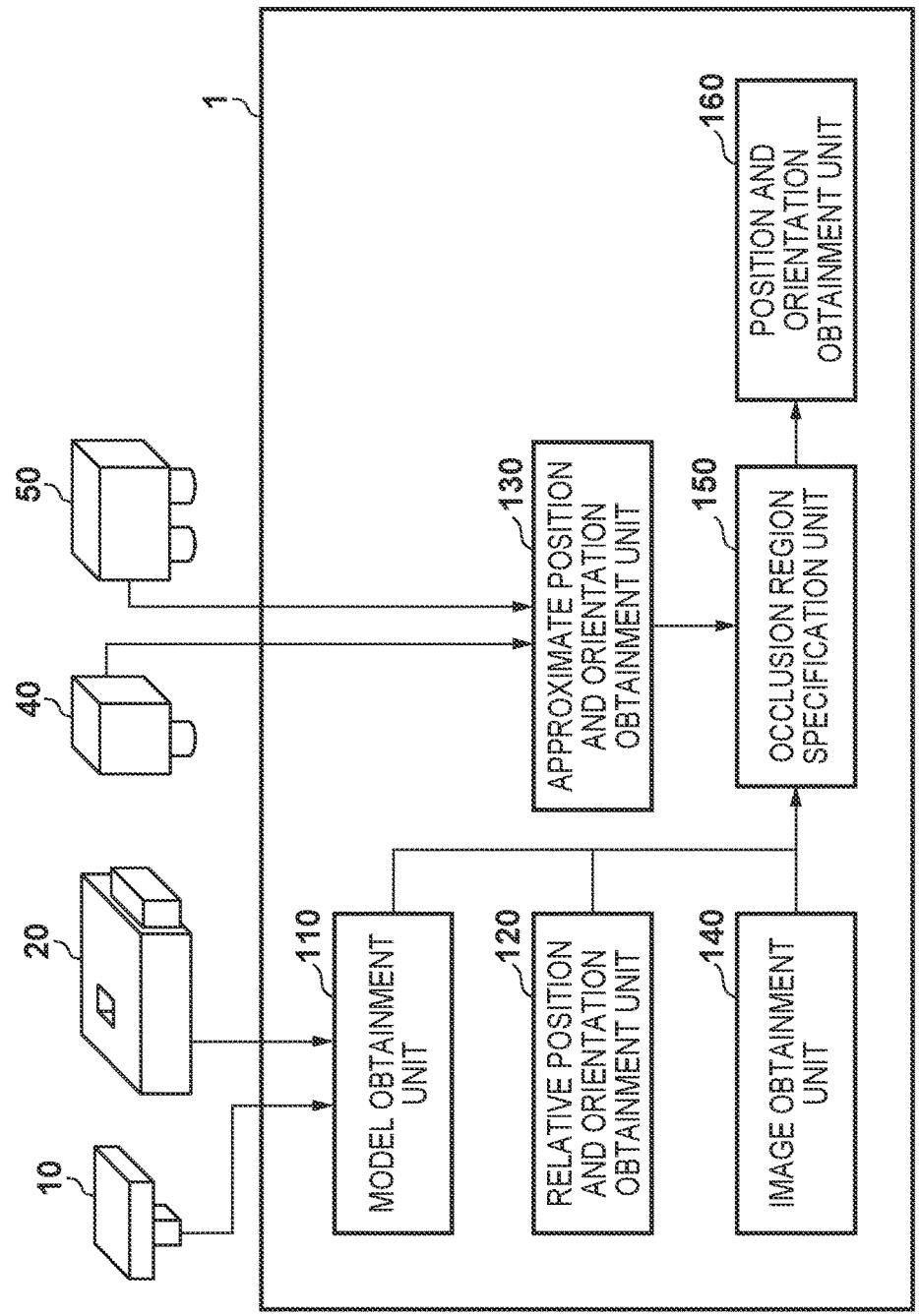
FIG. 2 is a view illustrating a configuration of an information processing apparatus according to the first embodiment.

Firstly, with reference to FIG. 2, explanation is given regarding an example of a configuration of an information processing apparatus 1 according to the present embodiment. The information processing apparatus 1 is provided with a model obtainment unit 110, a relative position and orientation obtainment unit 120, an image obtainment unit 130, an approximate position and orientation obtainment unit 140, an occlusion region specification unit 150, and a position and orientation obtainment unit 160.

The model obtainment unit 110 obtains a three-dimensional shape model 100 that expresses the shape of the assembly source part 10, and a three-dimensional shape model 200 that expresses the shape of the assembly destination part 20. Because something similar to what is conventional is used for a three-dimensional shape model, a detailed explanation is omitted, but, for example, it may be defined by information of faces configured by connecting points, and information of line segments that configure faces. Three-dimensional shape models 10 and 20 are saved in the model obtainment unit 110, and input to the occlusion region specification unit 150.

The relative position and orientation obtainment unit 120 inputs to the occlusion region specification unit 150 a relative position and orientation between the two parts for when the assembly source part 10 and the assembly destination part 20 are ideally assembled. Below, this relative position and orientation is referred to as an assembly position and orientation. The assembly position and orientation is, for example, set in advance by operating the three-dimensional shape models of the two part in a virtual space to arrange them into an ideal assembly state, and obtaining the relative relationship of the coordinate system between the two parts in that state. Alternatively, it may be obtained by a numeric operation based on dimension information of the two parts in advance. Alternatively, it may be by any method that can specifies the arrangement relationship between the two parts at the time of an ideal assembly.

A two-dimensional image capturing apparatus 40 is a camera for capturing a two-dimensional image. A captured two-dimensional image may be a grayscale image or may be a color image. In the present embodiment, the two-dimensional image capturing apparatus 40 outputs a grayscale image. An image captured by the two-dimensional image capturing apparatus 40 is input to the information processing apparatus 1 via the image obtainment unit 130. For internal parameters such as a lens distortion parameter, principal point, a focal length, or the like of the camera, a specification of a device that is used is referred to, or they are calibrated in advance by a method disclosed by R. Y. Tsai "A versatile camera calibration technique for high-accuracy 3D machine vision metrology using off-the-shelf TV cameras and lenses", IEEE Journal of Robotics and Automation, vol. RA-3, no. 4, 1987.

A range image capturing apparatus 50 measures three-dimensional information of points on an object surface which is a measurement target. A range sensor that outputs a range image is used as the range image capturing apparatus 50. A range image is an image in which each pixel has information of a depth. In the present embodiment, something having a one-shot active method that illuminates a target with a multi slit line to which is added color IDs having different wavelengths, captures a reflected light thereof by a camera, and performs a distance measurement by a triangulation method is used as the range sensor.

However, a range sensor is not limited to this, and may use a Time-of-flight method that uses the time of flight of light. In addition, it may use a passive method that calculates the depth of each pixel in accordance with a triangulation method, from an image captured by a stereo camera. In addition, it may be anything that measures a range image as long as it does not impair the essence of the present invention.

The range image measured by the range image capturing apparatus 50 is input to the information processing apparatus 1 via the image obtainment unit 130. In addition, it is assumed that optical axes match between the range image capturing apparatus 50 and the two-dimensional image capturing apparatus 40, and that a correspondence relationship between each pixel of the grayscale image output by the two-dimensional image capturing apparatus 40 and each pixel of the range image output by the range image capturing apparatus is known. However, application of the present invention is not limited to the case in which the grayscale image and the range image have the same viewpoint.

For example, configuration may be such that an image capturing apparatus for capturing a grayscale image and an image capturing apparatus for capturing a range image are at separate positions and orientations, and the grayscale image and the range image are each captured from a different viewpoint. In such a case, assuming that the relative positions and orientations between the image capturing apparatuses are known, by projecting a three-dimensional point cloud in the range image into the grayscale image, correspondence between the grayscale image and the range image is obtained.

To an extent that relative positions and orientations between image capturing apparatuses that capture the same object are known, and it is possible to calculate the correspondence between the images, there is no particular restriction on the positional relationship of the image capturing apparatuses. Note that it is assumed that a common coordinate system is set in the two-dimensional image capturing apparatus 40 and the range image capturing apparatus 50. This coordinate system is referred to below as the image capturing apparatus coordinate system.

The approximate position and orientation obtainment unit 140 obtains an approximate value of the position and orientation of the assembly destination part 20 with respect to the information processing apparatus 1. In the present embodiment, the position and orientation of the assembly destination part 20 with respect to the information processing apparatus 1 represents a position and an orientation of the assembly destination part 20 based on the image capturing apparatus coordinate system. However, there is not necessarily a need for it to be based on the image capturing apparatus coordinate system.

For example, if a relative position and orientation with respect to the image capturing apparatus coordinate system is known and that position and orientation does not change, it may be based on another object. In addition, the position and orientation obtained may be the position and orientation of the assembly source part. In such a case, an assembly position and orientation input by the relative position and orientation obtainment unit 120 may be used to calculate the position and orientation of the assembly destination part 20. In the present embodiment, it is assumed that an approximate position and orientation at which the assembly destination part 20 is placed is known in advance, and a value that is instructed in advance is used.

However, an approximate value of the position and orientation of the assembly destination part 20 does not necessarily need to be such a value. For example, configuration may be taken to measure an approximate value of the position and orientation of an object by performing object recognition processing with respect to a range image or a grayscale image that captures a scene that includes the assembly destination part 20, and an approximate value obtained by another method may be used.

When the occlusion region specification unit 150 observes the assembly destination part 20 after completion of assembly from an approximate position and orientation, a region that cannot be observed due to occlusion of the assembly source part 10 is specified. More specifically, a virtual camera is prepared, and based on the virtual camera, rendering of an image that arranges the assembly destination part 20 and the assembly source part 10 based on each of the input of the approximate position and orientation and the assembly position and orientation is performed.

At this point, rendering is performed by allocating specific colors such that it is possible to specify pixels of regions where the assembly source part 10 is projected. An image obtained by the rendering is input to the position and orientation obtainment unit 160. The input image is used to exclude the effect of an occlusion region that causes the reduction of precision when calculating the position and orientation of the assembly destination part 20. Details of this processing are described later.

The position and orientation obtainment unit 160 calculates the position and orientation of the assembly destination part 20 with respect to the image capturing apparatus coordinate system. Details of this processing are described later.

The above is an explanation regarding an example of the configuration of the information processing apparatus 1. Note that a computer is integrated in the information processing apparatus 1. The computer is equipped with a main controller such as a CPU, a ROM (Read Only Memory), a RAM (Random Access Memory), and a storage unit such as an HDD (Hard Disk Drive). In addition, the computer is also equipped with an input/output unit such as buttons and a display or a touch panel, the communication unit such as a network card, or the like. Note that each of these configuration units is connected by a bus or the like, and is controlled by the main controller reading out and executing a program stored in the storage unit.

<Processing>

Next, explanation is given regarding a processing procedure for calculation of the position and orientation of the assembly destination part 20, in the present embodiment. FIG. 3 is a flowchart that illustrates a processing procedure for calculating a position and orientation that is performed by the information processing apparatus 1 according to the present embodiment.

(Step S1000)

The image obtainment unit 130 obtains a range image and a grayscale image of the assembled part 30 in a state where the two parts are assembled. Firstly, the grayscale image is obtained from the two-dimensional image capturing apparatus 40. Similarly the range image is obtained from the range image capturing apparatus 50. In the present embodiment, it is assumed that the distance from the range image capturing apparatus 50 to the surface of the measurement object is stored in the range image.

Figure 6:
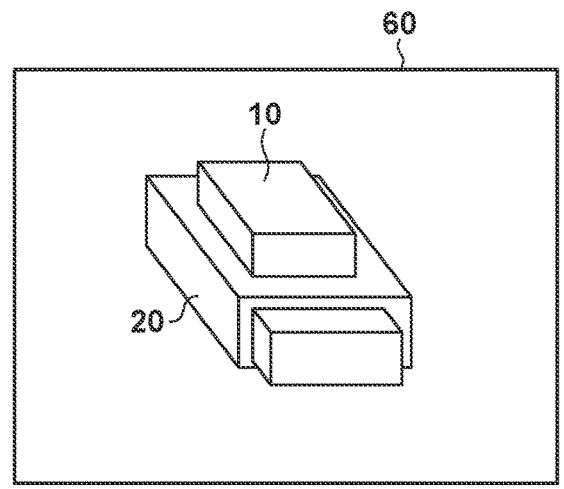
FIG. 6 is a view illustrating an example of a captured image of an assembled part according to the first embodiment.

As described above, because the optical axes of the two-dimensional image capturing apparatus 40 and the range image capturing apparatus 50 match, the correspondence between each pixel of the grayscale image and each pixel of the range image is known beforehand. FIG. 6 illustrates an example of a captured image 60 of the assembly source part 10 and the assembly destination part 20 after the completion of the assembling. Note that in FIG. 6 only a grayscale image is illustrated to simplify the explanation.

(Step S1100)

The approximate position and orientation obtainment unit obtains an approximate value (an approximate position and orientation 710 described later) of the position and orientation of the assembly destination part 20 with respect to the image capturing apparatus configured by including the two-dimensional image capturing apparatus 40 and the range image capturing apparatus 50. As described above, in the present embodiment, it is assumed that an approximate position and orientation at which the assembly destination part 20 is placed is known in advance, and the value thereof is used as an approximate value.

(Step S1200)

The occlusion region specification unit 150 uses the approximate value of the position and orientation obtained in step S1100, the three-dimensional shape models 100 and 200, and the assembly position and orientation to specify a region where the assembly destination part 20 is occluded on the range image and the grayscale image.

Below, with reference to the flowchart of FIG. 4, explanation is given regarding processing to specify an occlusion region in step S1200.

(Step S1210)

Figure 7:
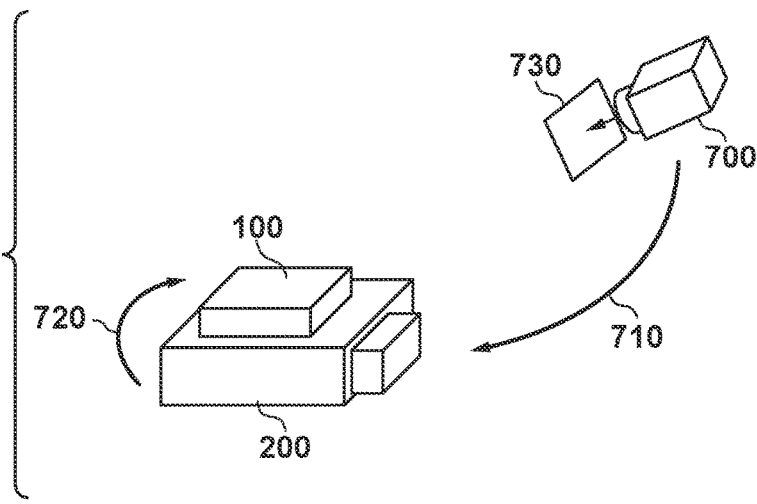
FIG. 7 is a view for explaining an arrangement of a model with respect to a virtual camera according to the first embodiment.

As illustrated in FIG. 7, a virtual camera 700 is prepared, and, based on the virtual camera 700, the three-dimensional shape model 200 of the assembly destination part 20 is arranged at the approximate position and orientation 710 obtained in step S1100. Here it is desirable for the internal parameters of the virtual camera 700 to be the same values as those of the range image capturing apparatus 50 and the two-dimensional image capturing apparatus 40 as much as possible. However, there is not necessarily a need to use the same values. If it is possible to obtain a pixel correspondence between the two-dimensional image capturing apparatus 40 and the range image capturing apparatus 50 and a region specifying image generated in step S1230 that is described later, different internal parameters may be used.

(Step S1220)

Based on the three-dimensional shape model 200 of the assembly destination part 20 arranged in step S1210, the three-dimensional shape model 100 of the assembly source part 10 is arranged at an assembly position and orientation 720 obtained by the relative position and orientation obtainment unit 120.

(Step S1230)

Figure 8:
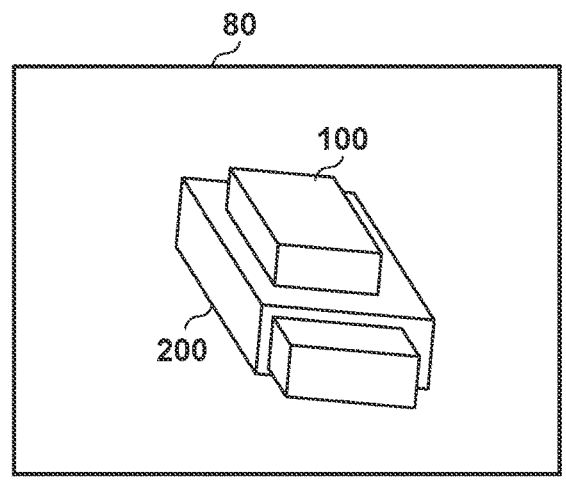
FIG. 8 is a view for explaining generation of a virtual image according to the first embodiment.

A virtual image 80 observed by the virtual camera 700 of the two models arranged in step S1210 and in step S1220 is illustrated in FIG. 8. In this step, an image 80 in which it is possible to specify a region where the three-dimensional shape model 200 of the assembly destination part 20 may be occluded by the three-dimensional shape model 100 of the assembly source part 10 is generated. Specifically, the virtual image 80 is generated by rendering the arranged three-dimensional shape models of the two parts in a virtual image plane 730. At this point, hidden surface processing is performed, and rendering is performed by deleting parts for which a viewpoint becomes shaded and cannot be seen.

Figure 9:
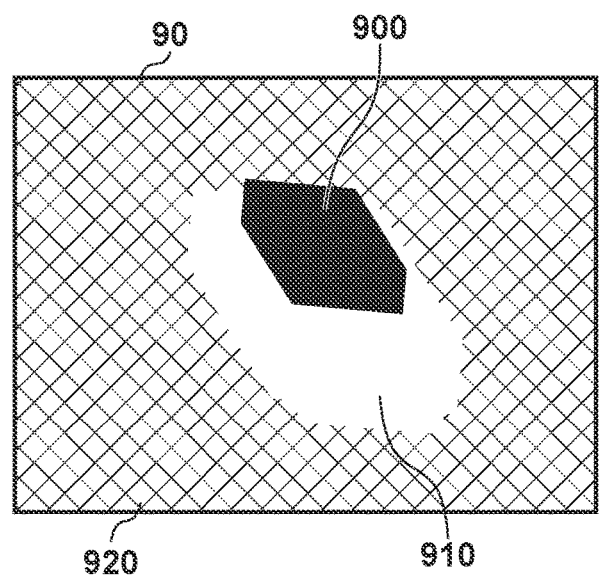
FIG. 9 is a view for explaining generation of a region identification image according to the first embodiment.

Furthermore, rendering is performed by allocating specific colors (luminance values) to each of the three-dimensional shape models of the assembly source part 10 and the assembly destination part 20. FIG. 9 illustrates a virtual image 90 that is obtained. By referring to the luminance value of each pixel of the virtual image 90, a projection region 900 of the assembly source part 10, a projection region 910 of the assembly destination part 20, and a background region 920 can be specified. The image generated in this step is referred to below as a region specifying image.

Note that a method of generating the region specifying image is not limited to this. For example, configuration may be taken to calculate a line-of-sight vector from the virtual camera 700 with respect to each pixel of the virtual image plane 730, and specify a region of a target part that is projected on each pixel in accordance with an intersection position between the line-of-sight vector and the three-dimensional shape model, without performing rendering. Specifically, the existence or absence of an intersection between the line-of-sight vector and the three-dimensional shape models of the two parts is checked, and if an intersection point is present, an image is generated by allocating specific luminance values to each three-dimensional shape model at that pixel.

For a pixel where there is an intersection for both of the two parts, a specific luminance value is allocated to the three-dimensional shape model that the intersection point is in front of. In addition, any method may be used if it can specify a region where each the models of the assembly source part 10 and the assembly destination part 20 are projected with respect to each pixel.

(Step S1300)

The position and orientation obtainment unit 160 uses the assembly destination part 20 and the three-dimensional shape model 200 as well as the correspondence relationship between the grayscale image and the range image to calculate the position and orientation of the assembly destination part 20. In such a case, by referring to the region specifying image, the effect of the occlusion region is reduced. Below, the flowchart of FIG. 5 is used to give a detailed explanation.

(Step S1310)

The position and orientation obtainment unit 160 uses the region specifying image and extracts and generates geometric features as information for obtaining the position and orientation from the three-dimensional shape model 200 of the assembly destination part 20. In the present embodiment, the three-dimensional shape model is assumed to be configured by a plurality of NURBS (Non-Uniform Rational B-Spline) curved surfaces. In the geometric features of the models, it is assumed that local three-dimensional plane information (hereinafter referred to as a "local surface feature") on an object surface configured by a three-dimensional position and a normal, and local three-dimensional line segment information (hereinafter referred to as a "local line feature") on an object outline configured from a three-dimensional position and a direction are extracted.

Note that, if merely geometric features are referred to, it is assumed to indicate both of local surface features and local line features. Note that geometric features extracted are not particularly limited if it is three-dimensional geometric information that represents a target shape. For example, it may be a collection of simple three-dimensional points, and may be a collection of three-dimensional lines that represent edge lines. In addition, it may be anything if it can be used for a position and orientation.

Figure 10:
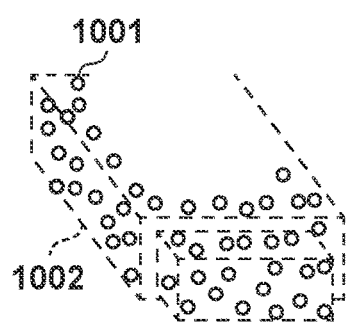
FIG. 10 is a view for explaining extraction of model geometric features according to the first embodiment.

Extraction of geometric features is performed by randomly sampling pixels projected by the assembly destination part 20 on the region specifying image, and performing a back projection to calculate geometric features on the three-dimensional shape model 200 that correspond to the pixels. The sampling of the pixels may be performed with respect to all pixels, and may be performed evenly. In such a case, the value of each pixel of the region specifying image is referred to and geometric features are not extracted from a region where the assembly destination part is not projected. Because of this, it is possible to extract geometric features (local surface features 1001 and local line features 1002) as information for obtaining a position and orientation from a portion where occlusion does not occur, by excluding a portion that is occluded by the assembly source part 10, as illustrated in FIG. 10. However, the method does not particularly matter if it is able to extract, from the surface of a three-dimensional shape model, geometric features of the model.

Note that configuration may be taken to render the three-dimensional shape model from all directions and generate each region specifying image, and register model geometric features that can be observed from each direction without occlusion in association each direction. By this it is possible to extract geometric features by selecting a geometric feature that is registered to a direction closest to a line-of-sight vector calculated from the camera parameters and the approximate value of the position and orientation of the assembly destination part 20. Note that configuration may be taken so as compare a dot product between a normal of the geometric feature and a vector of each direction, and only register a geometric feature for which the normal of the geometric feature and a direction vector are opposite to each other.

(Step S1320)

The position and orientation obtainment unit 160 performs association between the three-dimensional shape model 200 and three-dimensional point cloud in the range image measured in step S1000, based on the approximate position and orientation of the assembly destination part 20 obtained in step S1210. Using the approximate position and orientation of the part and the internal parameters of the range image capturing apparatus 50, each local surface feature extracted in step S1310 is projected onto the range image. Distance points on the range image that correspond to each of the projected local surface features are held as three-dimensional points for each face.

Next, the position and orientation obtainment unit 160 associates edges on the grayscale image with the three-dimensional shape model. Similarly to step S1320, the approximate position and orientation of the assembly destination part 20 and the internal parameters of the two-dimensional image capturing apparatus 40 are used to project local line features that configure the three-dimensional shape model onto the image, and edges detected on the image are associated with the local line features in the three-dimensional shape model. If a plurality of edges are detected for each local line feature, an edge, out of the plurality of edges detected, that is closest on the image with respect to the projected local line features is associated.

(Step S1330)

The position and orientation obtainment unit 160 calculates the position and orientation of the assembly destination part 20 and the assembly source part 10, based on association data between edges on the grayscale image that correspond to each line segment in the three-dimensional shape model and the three-dimensional points in the range image that correspond to each face in the three-dimensional shape model, that are obtained in step S1320. In this step, based on the calculated association data, an update of the position and orientation is performed by solving a linear simultaneous equation such that an error between the measurement data and the three-dimensional shape model becomes a minimum.

Here, because scales between distances in the image and distances in the three-dimensional space are different, there is the possibility that a contribution rate of either of the measurement data distorting if the simultaneous equations are simply solved. Accordingly, in the present embodiment, position and orientation estimation that aligns degrees by performing minimization based on a maximum likelihood estimate as illustrated in Tateno, Kotake, Uchiyama "A Model Fitting Method Using Intensity and Range Images for Bin-Picking Applications", IEICE Transactions on Information and Systems J94-D(8), 1410-1422, 2011.

In relation to a position and orientation estimation method based on a maximum likelihood estimate, because it is not related to the essence of the present invention, a detailed explanation is omitted. Note that a calculation method of a position and orientation is not limited to the above-described method based on a maximum likelihood estimate, and, for example, may be by performing an iterative calculation according to a Levenberg-Marquardt method, or may be by performing a steepest descent method which is a simpler method. In addition, another nonlinear optimized calculation method such as a conjugate gradient method or an ICCG method may be used.

Note that, although discussion was given here regarding a method that uses a grayscale image and a range image in alignment, a similar method can of course be used in a case of calculating the position and orientation by using only a grayscale image or only a range image.

(Step S1400)

The position and orientation obtainment unit 160 performs a determination of whether the position and orientation updated in step S1330 is converging—in other words whether there is need for a further repeated calculation. Specifically, it is determined to have converged if the correction value is approximately 0, or if a difference between a sum of squares of an error vector before the correction and after the correction is approximately 0. If not converging (step S1400: NO), the processing returns to step S1100, and the updated position and orientation is used to perform position and orientation estimation processing again. If it is determined to be converging (step S1400: YES), the processing terminates, and a final estimated value of the position and orientation of the assembly destination part 20 with respect to the image capturing apparatus is decided.

Therefore, in the first embodiment, detailed discussion was given regarding a method, based on the relative relationship between the assembly destination part 20 and the assembly source part 10, that specifies a region on an image where the assembly destination part 20 that is a measurement target is occluded, and uses a three-dimensional shape model of a portion that is not occluded to calculate the position and orientation.

By virtue of the present embodiment, it becomes possible to robustly and with high precision calculate a position and orientation with respect to a three-dimensional shape model of an assembly destination part without the influence of a mismatch between measurement data and the model due to an occlusion region, by not using a portion where occlusion occurs due to an assembly source part.

(Variation 1-1)

In the present embodiment, explanation is given of an example of measuring the assembly destination part 20. However, it is of course possible to apply a similar method, even in calculation of the position and orientation of the assembly source part 10. In a situation where the assembly source part 10 is occluded by the assembly destination part 20, a robust and highly precise estimation is possible by using a similar method to the present embodiment to perform a position and orientation calculation that excludes the effect of an occluded portion due to the assembly destination part 20.

(Variation 1-2)

Figure 13:
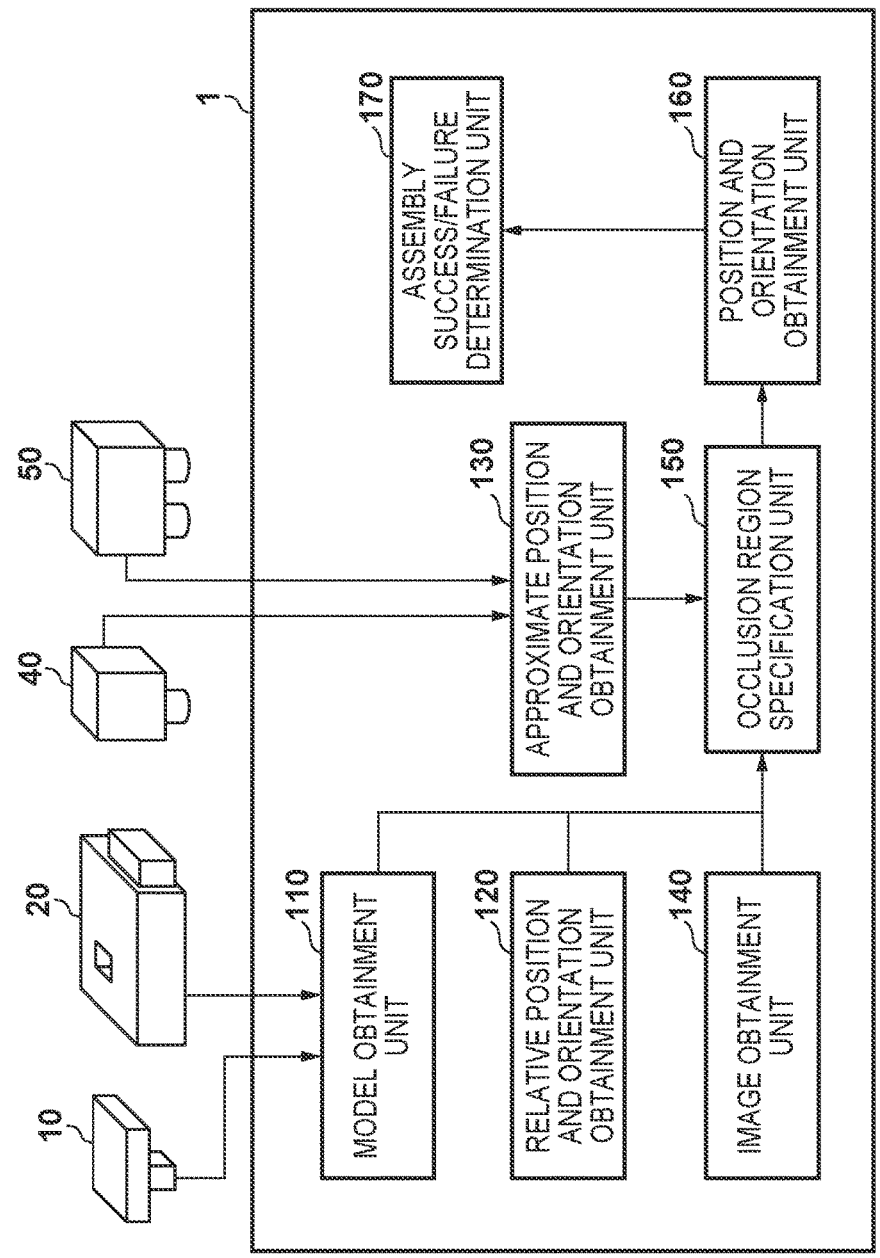
FIG. 13 is a view illustrating a configuration of an information processing apparatus according to a variation 1-2 of the first embodiment.

Configuration may be taken to use the methods discussed here and further perform a determination of whether assembling has been correctly performed (an assembly success/failure determination). The determination of assembly success/failure can by performed by adding an assembly success/failure determination unit 170 to the device configuration of the first embodiment, as illustrated in FIG. 13. Firstly, by the method described previously, the position and orientation obtainment unit 160 calculates the position and orientation of each of the assembly destination part 20 and the assembly source part 10 in the assembled state. Subsequently, the relative position and orientation of both parties are calculated based on each of the calculated positions and orientations. In contrast to this, the assembly success/failure determination unit 170 holds in advance a relative position and orientation between the assembly source part 10 and the assembly destination part 20 in an ideal assembly state, and performs a comparison with the calculated relative positions and orientations. As a result, assembly failure is determined if a difference of both parties with respect to position and orientation is greater than or equal to a predetermined value, and assembly success is determined if it is less than the predetermined value. Note that a determination of success/failure may be performed by using either a difference of positions or a difference of orientations. Because of this, it is possible to stably determine assembly success/failure even in a situation where occlusion has mutually occurred between parts due to the assembly.

(Variation 1-3)

In the embodiment described above, discussion was given regarding an example in which the assembled part 30 configured from two parts was taken as a target. However, a similar method can be applied even in a case of calculating the position and orientation of one part out of an assembled part configured by three or more parts. In such a case, based on known assembly information of the configured part, a region for which a measurement target part is occluded on a captured image is specified, and a position and orientation calculation is performed without extracting model geometric features from an occluded portion. Because of this estimation that is robust and highly precise is possible by excluding the effect of the occluded portion.

Second Embodiment: Calculate a Position and Orientation Based on Occlusion Information Added to Model Geometric Features In the first embodiment, discussion was given regarding a method of calculating a position and orientation by extracting model geometric features from a portion for which observation without occlusion is possible.

In contrast to this, configuration may be taken to extract model geometric features irrespective of whether occlusion occurs, and add at that time an attribute for whether occlusion occurs. It is possible to reduce an effect due to occlusion by setting a level of contribution when calculating a position and orientation, in accordance with the attribute of each model geometric feature. Specifically, in step S1310 of the first embodiment, geometric features of the assembly destination part 20 are extracted even for a portion where occlusion occurs.

At such time, based on a corresponding pixel of the region specifying image, whether it is a portion where occlusion occurs is specified, and stored together with each geometric feature. Configuration is such that, when performing the association in step S1320, correspondence is not made for portions of an occlusion region. Alternatively, when calculating the position and orientation in step S1330, the position and orientation is calculated by setting the level of contribution of geometric features where occlusion occurs to low and setting the level of contribution of geometric features where occlusion does not occur to high.

Alternatively, configuration may be taken to store in advance a value illustrating an occlusion degree in a pixel value of the region specifying image, and calculate the position and orientation by setting the level of contribution of each geometric feature based on this value. Specifically, firstly if a separate part that occludes a measurement target part is present, with respect to each pixel of the region specifying image, a distance in a depth (line of sight) direction between a face that occludes and a face of the measurement target part is stored as an occlusion degree. In step S1310, when extracting a model geometric feature, a corresponding pixel of the region specifying image referred to, and the occlusion degree is added in advance. When calculating the position and orientation, the position and orientation is calculated by setting the level of contribution to low for where the occlusion degree added to a model geometric feature is high, and setting the level of contribution to high where the occlusion degree is low. Note that a value other than a distance in the depth direction may be used for the occlusion degree. For example, configuration may be taken to, with respect to a pixel of a portion where occlusion occurs, obtain a shortest distance to a portion on the image surface where occlusion does not occur, and use this value as the occlusion degree. Even in such a case, the position and orientation is calculated by setting the level of contribution to low where the occlusion degree is high, and setting the level of contribution to high where it is low. In addition, configuration may be taken to consider the effect on a position and orientation calculation due to occlusion, and perform the calculation of the occlusion degree and the setting of the level of contribution when calculating the position and orientation by any method.

Therefore, by virtue of the second embodiment, it becomes possible to robustly and with high precision calculate the position and orientation by adding an attribute to a model feature of whether it is an occluded portion, and changing a level of contribution to the calculation of the position and orientation based on the attribute.

(Variation 2-1: Disabling the Occlusion Region on the Image)

In the second embodiment, discussion was given regarding a method of calculating the position and orientation without receiving an effect due to occlusion, by extracting model geometric features based on a determination result of whether each portion is occluded. In contrast to this, configuration may be taken to calculate the position and orientation by excluding from a captured image portions where occlusion occurs, instead of model geometric features. In such a case, in step S1310, the model geometric features are extracted regardless of whether occlusion occurs. In addition, adding an attribute to a model geometric feature is not performed at that time. Instead, after performing the association of model geometric features in step S1320, the region specifying image of the associated pixels is referred to, and if the pixels are an occlusion region, the association is disabled and not used in the position and orientation calculation.

Figure 11:
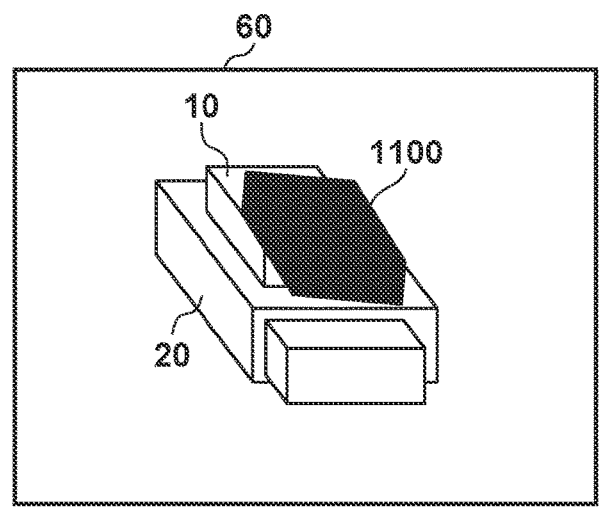
FIG. 11 is a view for explaining extraction of model geometric features according to the first embodiment.

Alternatively, by referring to a region specifying image value with respect to each pixel of the grayscale image and the range image input in step S1000, an invalid value is set to a pixel corresponding to a projection area of the assembly destination part 20. FIG. 11 is an example of an image in which invalid values have been set to an occlusion region 1100 due to the assembly source part 10, with respect to the captured image 60 of FIG. 6 in the first embodiment. In step S1320, association is performed by targeting only pixels for which an invalid value is not set.

Note that, in the present variation, similarly to in the second embodiment, configuration may be taken such that occlusion degrees are set with respect to a captured image, and levels of contribution are set when calculating a position and orientation. In addition, configuration may be taken to combine the first embodiment and the present variation to calculate the position and orientation by excluding an occlusion region from both of model geometric features and a captured image, based on the region specifying image.

Therefore, by virtue of variation 2-1, by determining whether there is an occluded portion with respect to a captured image and not using the occluded portion in calculation of a position and orientation, it is possible to robustly and with high precision calculate the position and orientation without receiving an effect of the occluded portion.

Third Embodiment: Excluding Occlusion Due to a Hand when Measuring a Part Gripped by the Hand In the first embodiment and the second embodiment, discussion was given of a method of stably performing a position and orientation calculation of one part of an assembled part configured by the assembly of a plurality of parts.

In the present embodiment, calculating a position and orientation by capturing an image of a part (a gripped part) for which gripping is performed by a robot hand, by an image capturing apparatus attached to the hand, is envisioned. Note that, for the image capturing apparatus, something installed in a fixed manner within the operation range of a robot without being attached to a hand may be used. Discussion is given regarding a method of stably calculating a position and orientation without receiving an effect of occlusion due to the hand in such a case.

Figure 12:
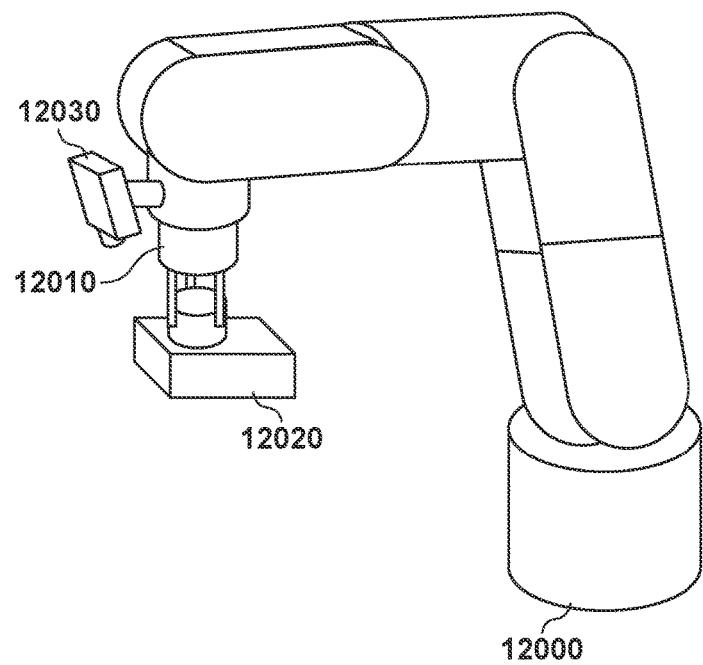
FIG. 12 is a view illustrating an example configuration of a robot system according to a second embodiment.

As illustrated by an example in FIG. 12, attaching a robot hand 12010 to a leading end of a robot arm 12000 and capturing, by an image capturing apparatus 12030 attached to the robot hand 12010, a gripped part 12020 that is gripped by the robot hand 12010 to calculate a position and orientation is envisioned. Note that the "position and orientation" discussed in the present embodiment means a position and orientation relation between a gripped part and an image capturing apparatus (not shown) that captures the part.

The present embodiment can essentially be implemented by a similar device configuration to that in the first embodiment, by, in the first embodiment, respectively replacing the assembly source part 10 by the robot hand 12010 and the assembly destination part 20 by the gripped part 12020. However, in the present embodiment, the relative position and orientation obtainment unit 120 inputs to the occlusion region specification unit 150 a relative position and orientation between the robot hand 12010 and the gripped part 12020 when the gripped part 12020 is ideally gripped, as gripping information instead of the assembly information.

By virtue of the present embodiment, it is possible to calculate the position and orientation of a gripped part with high precision, without receiving the effect of occlusion due to a robot hand that performs the gripping.

By virtue of the present invention, it is possible to robustly and with good precision obtain a position and orientation even with respect to a part for which occlusion occurs in accordance with another part due to assembly.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-040445, filed Mar. 2, 2016, and 2017-002117, filed Jan. 10, 2017, which are hereby incorporated by reference wherein in their entirety.

What is claimed is:

1. An information processing apparatus, comprising:
one or more processors; and
a memory coupled to the one or more processors, the memory having stored thereon instructions which, when executed by the one or more processors, cause the information processing apparatus to:
obtain a relative position and orientation between a first object and a second object;
specify an occlusion region where the second object occludes the first object, from an image that includes the first object and the second object, based on the relative position and orientation, a first shape model that represents a shape of the first object, and a second shape model that represents a shape of the second object;
select, from the first shape model, model features other than model features that correspond to the specified occlusion region in the image;
calculate the position and orientation of the first object by associating the selected model features with image features in the image; and
determine an assembly state based on the position and orientation of the first object.

2. The information processing apparatus according to claim 1, wherein the instructions, when executed by the one or more processors, further cause the information processing apparatus to obtain each of the first shape model and the second shape model.

3. The information processing apparatus according to claim 1, wherein in selecting the model features, the instructions, when executed by the one or more processors, cause the information processing apparatus to:
  calculate, with respect to the occlusion region, an occlusion degree that represents a degree at which the second object occludes the first object,
  set a level of contribution when obtaining the position and orientation of the first object, based on the occlusion degree, and
  select the model features using the level of contribution.

4. The information processing apparatus according to claim 1, wherein in specifying the occlusion region, the instructions, when executed by the one or more processors, cause the information processing apparatus to specify the occlusion region based on a first relative position and orientation between the first object and the second object that is stored in advance, and an approximate position and orientation of the first object.

5. The information processing apparatus according to claim 4, wherein in specifying the occlusion region, the instructions, when executed by the one or more processors, cause the information processing apparatus to specify the occlusion region based on a result of rendering model information of the first object based on the approximate position and orientation of the first object, and a result of rendering the second object based on an approximate position and orientation of the second object that is obtained based on the first relative position and orientation.

6. The information processing apparatus according to claim 1, wherein in specifying the occlusion region, the instructions, when executed by the one or more processors, cause the information processing apparatus to specify the occlusion region by generating an image indicating a region in the image occupied by the second object, based on an approximate position and orientation of the second object and the second shape model of the second object.

7. The information processing apparatus according to claim 1, wherein the instructions, when executed by the one or more processors, further cause the information processing apparatus to obtain a position and orientation of the second object based on the occlusion region and model information of the second object.

8. The information processing apparatus according to claim 7,
  wherein the instructions, when executed by the one or more processors, further cause the information processing apparatus to estimate a first relative position and orientation between the first object and the second object, based on the position and orientation of the first object and the position and orientation of the second object, and
  wherein in determining the assembly state, the instructions, when executed by the one or more processors, cause the information processing apparatus to determine the assembly state based further on the estimated first relative position and orientation.

9. The information processing apparatus according to claim 8, wherein in determining the assembly state, the instructions, when executed by the one or more processors, cause the information processing apparatus to determine the assembly state based further on a difference between the first relative position and orientation and a second relative position and orientation between the first object and the second object that is stored in advance.

10. An information processing apparatus comprising:
  one or more processors; and
  a memory coupled to the one or more processors, the memory having stored thereon instructions which, when executed by the one or more processors, cause the information processing apparatus to:
    obtain a relative position and orientation between a first object and a second object;
    specify an occlusion region where the second object occludes the first object, from an image that includes the first object and the second object, based on the relative position and orientation, a first shape model that represents a shape of the first object, and a second shape model that represents a shape of the second object;
    select image features other than image features included in the specified occlusion region in the image;
    calculate the position and orientation of the first object by associating the selected image features with model features of the first shape model; and
    determine an assembly state based on the position and orientation of the first object.

11. The information processing apparatus according to claim 10, wherein the image features in the image is a geometric feature of the image.

12. A method of controlling an information processing apparatus, comprising:
  obtaining a relative position and orientation between a first object and a second object;
  specifying an occlusion region where the second object occludes the first object, from an image that includes the first object and the second object, based on the relative position and orientation, a first shape model that represents a shape of the first object, and a second shape model that represents a shape of the second object;
  selecting, from the first shape model, model features other than model features that correspond to the specified occlusion region in the image;
  calculating the position and orientation of the first object by associating the selected model features with image features in the image; and
  determining an assembly state based on the position and orientation of the first object.

13. A non-transitory computer-readable storage medium storing a computer program for causing a computer to execute a method comprising:
  obtaining a relative position and orientation between a first object and a second object;
  specifying an occlusion region where the second object occludes the first object, from an image that includes the first object and the second object, based on the relative position and orientation, a first shape model that represents a shape of the first object, and a second shape model that represents a shape of the second object;
  selecting, from the first shape model, model features other than model features that correspond to the specified occlusion region in the image;
  calculating the position and orientation of the first object by associating the selected model features with image features in the image; and
  determining an assembly state based on the position and orientation of the first object.

14. A method of controlling an information processing apparatus, comprising:
  obtaining a relative position and orientation between a first object and a second object;
  specifying an occlusion region where the second object occludes the first object, from an image that includes the first object and the second object, based on the relative position and orientation, a first shape model that represents a shape of the first object, and a second shape model that represents a shape of the second object;

selecting image features other than image features included in the specified occlusion region in the image;

calculating the position and orientation of the first object by associating the selected image features with model features of the first shape model; and determining an assembly state based on the position and orientation of the first object.

15. A non-transitory computer-readable storage medium storing a computer program for causing a computer to execute a method comprising:

obtaining a relative position and orientation between a first object and a second object;

specifying an occlusion region where the second object occludes the first object, from an image that includes the first object and the second object, based on the relative position and orientation, a first shape model that represents a shape of the first object, and a second shape model that represents a shape of the second object;

selecting image features other than image features included in the specified occlusion region in the image;

calculating the position and orientation of the first object by associating the selected image features with model features of the first shape model; and determining an assembly state based on the position and orientation of the first object.

* * * * *